(12) United States Patent
Uchida et al.

(10) Patent No.: US 7,059,911 B2
(45) Date of Patent: Jun. 13, 2006

(54) CARD HOLDER FOR SIM SOCKET

(75) Inventors: Shinji Uchida, Kanagawa (JP);
Tetsuichiro Imaizumi, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/205,133

(22) Filed: Aug. 17, 2005

(65) Prior Publication Data

US 2006/0040560 A1   Feb. 23, 2006

(30) Foreign Application Priority Data

Aug. 19, 2004   (JP) ............................. 2004-240096

(51) Int. Cl.
*H01R 24/00* (2006.01)

(52) U.S. Cl. ................................. 439/630

(58) Field of Classification Search ............... 439/630, 439/159, 631
See application file for complete search history.

(56) References Cited

U.S. PATENT DOCUMENTS

| | | | | |
|---|---|---|---|---|
| 5,906,516 A | * | 5/1999 | Sato et al. | 439/630 |
| 6,129,558 A | * | 10/2000 | Kihira et al. | 439/66 |
| 6,439,903 B1 | * | 8/2002 | Burkart | 439/159 |
| 6,503,092 B1 | * | 1/2003 | Sato | 439/159 |
| 6,547,601 B1 | * | 4/2003 | Oguchi | 439/630 |
| 6,585,542 B1 | * | 7/2003 | Nishio et al. | 439/630 |
| 6,619,991 B1 | * | 9/2003 | Nishio et al. | 439/630 |
| 6,717,805 B1 | * | 4/2004 | Liu et al. | 361/684 |
| 6,719,589 B1 | * | 4/2004 | Nishio et al. | 439/630 |
| 6,761,569 B1 | * | 7/2004 | Nakamura | 439/159 |
| 6,881,097 B1 | * | 4/2005 | Matsunaga et al. | 439/630 |
| 6,913,492 B1 | * | 7/2005 | Kuroda et al. | 439/631 |
| 2004/0209519 A1 | * | 10/2004 | Yokoyama | 439/630 |

FOREIGN PATENT DOCUMENTS

| | | |
|---|---|---|
| EP | 1 133 065 B1 | 2/2002 |
| EP | 1 511 125 A1 | 3/2005 |
| JP | 8-87582 A | 4/1996 |
| JP | 2001-237010 A | 8/2001 |
| JP | 2001-244004 A | 9/2001 |
| JP | 2003-86275 A | 3/2003 |
| JP | 2004-6072 A | 1/2004 |
| WO | WO-01/63547 A2 | 8/2001 |
| WO | WO-01/63885 A2 | 8/2001 |

* cited by examiner

*Primary Examiner*—Tulsidas C. Patel
*Assistant Examiner*—Harshad C Patel
(74) *Attorney, Agent, or Firm*—Rader, Fishman & Grauer PLLC (57) ABSTRACT

Slide parts (32,33), along which the card holder (3) is slid in, are formed on side faces of the card holder (3) along inside faces of guide walls (4,5) of a SIM socket (1). Each of the slide parts (32,33) has a contact piece (36) extended more outwardly than outer surfaces of the slide parts (32,33). The contact piece (36) of the card holder (3) reaches a state of being pressed against the inside faces of the guide walls (4,5) of the SIM socket (1). Therefore, the card holder (3) inserted therein can be prevented from moving in the width direction (B) (i.e., in the direction perpendicular to the insertion direction). Additionally, since the card holder (3) is inserted while allowing the contact piece (36) to be pressed against the inside faces of the guide walls (4,5) of the SIM socket (1), the card holder (3) can be smoothly inserted.

4 Claims, 8 Drawing Sheets

CARD HOLDER FOR SIM SOCKET

BACKGROUND OF THE INVENTION

1. Field of the Invention

This invention relates to a card holder that holds a memory card used in communication devices such as mobile telephones, and, more particularly, to a card holder that can be inserted into a SIM socket attached to a circuit board in a device body.

2. Description of Related Art

A communication device (hereinafter, referred to as "mobile telephone etc."), such as a mobile telephone or a PDA, is used in a state of registering personal information. Therefore, when the present model is changed to a new model, the personal information registered thereon is desirably required to be easily transferred from the present model to the new model.

Accordingly, a structure has been employed in which personal information is stored in a memory card, in which a SIM (Subscriber Identification Module) socket is attached to an internal substrate of a mobile telephone etc., and in which the memory card is detachably set into the SIM socket.

In more detail, a SIM socket is attached to an internal substrate of a mobile telephone etc., by soldering. The SIM socket is formed integrally with a resinous connector housing having an opening in the outer part of the mobile telephone etc., and a memory card can be inserted into this connector housing.

When the model of the mobile telephone etc., is changed to a new one, the memory card is removed from the connector housing, and the memory card is inserted into the new model so as to transfer data.

There is a case in which the memory card is inserted independently. Additionally, a structure is known in which the memory card is temporarily stored in a card holder without being inserted independently, and the card holder holding the memory card is inserted into an opening of a connector housing of a mobile telephone etc.

Meanwhile, when the card holder holding the memory card is inserted into an opening of the connector housing, if an unsteady movement in an insertion direction and in a width direction perpendicular to the insertion direction occurs in the card holder, a connection terminal of the memory card and a connection terminal of the SIM socket connected to the connection terminal of the memory card will slide, and metallic films formed on the surfaces of both connection terminals will be peeled off. As a result, oxidization becomes liable to occur, and causes a contact failure.

Therefore, it is preferable to form a structure in which the card holder inserted therein does not move or shake in an unsteady manner in the insertion direction and in the width direction perpendicular thereto.

Additionally, there is a case in which an excessive force is applied to the connection terminal if the card holder cannot be smoothly slid while it is being inserted. Likewise, this causes a contact failure.

Therefore, it is preferable that the card holder can be smoothly slid while being inserted.

It is therefore an object of the present invention to provide a card holder for a SIM socket that has a simple structure and that dose not move or shake in an unsteady manner when the card holder holding a memory card is inserted into the SIM socket and after the card holder is inserted and held in position.

SUMMARY OF THE INVENTION

A card holder for a SIM socket of the present invention is characterized by including slide parts, along which the card holder is slid in, formed on side faces of the card holder along inside faces of guide walls of the SIM socket, and is characterized in that each of the slide parts has a contact piece that is extended more outwardly than an outer surface of the slide part.

With this structure, since the contact piece of the card holder is extended more outwardly than the outer surface of the slide part, the contact piece of the card holder inserted therein reaches a state of being pressed against the inside face of the guide wall of the SIM socket. Therefore, the card holder inserted therein can be prevented from moving in the width direction (i.e., direction perpendicular to the insertion direction). Additionally, since the contact piece of the card holder is pressed against the inside face of the guide wall of the SIM socket when the card holder is inserted, the card holder can be smoothly inserted.

Preferably, the contact piece has a bulging shape. If the contact piece is shaped like this, the contact piece can elastically move in the width direction with ease.

Preferably, a space exists between the contact piece and a main body of the card holder. This space enables the contact piece to move more elastically.

Preferably, the slide part of the card holder has a first engagement part that is engaged with a rear lock part provided on the guide wall of the SIM socket in a state in which the card holder is inserted into an inmost part. Since the first engagement part is engaged with the rear lock part of the SIM socket in a state in which the card holder holding the memory card is inserted, the card holder can be locked at a predetermined position of the connector housing so that the card holder holding the memory card does not easily move in the insertion direction.

Preferably, the side face of the card holder has a second engagement part that is engaged with a front lock part provided on the guide wall of the SIM socket in a state in which the card holder is drawn out to a hithermost part. Since the second engagement part is engaged with the front lock part of the SIM socket when the card holder holding the memory card is extracted, the card holder can be temporarily stopped at a predetermined position of the connector housing so that the card holder holding the memory card does not easily fall off.

Preferably, a slit extending in the insertion direction is formed near a front end of the card holder of the present invention. This slit enables the second engagement part to easily move in the width direction and easily go beyond the front lock part when the card holder holding the memory card is inserted.

The aforementioned advantage, other advantages, features, and effects of the present invention will become apparent from the following description of an embodiment given with reference to the accompanying drawings.

DETAILED DESCRIPTION OF PREFERRED EMBODIMENTS

A description will be hereinafter given of an embodiment of the present invention taking, as an example, a SIM socket attached to a circuit board in a mobile telephone.

Figure 1A:
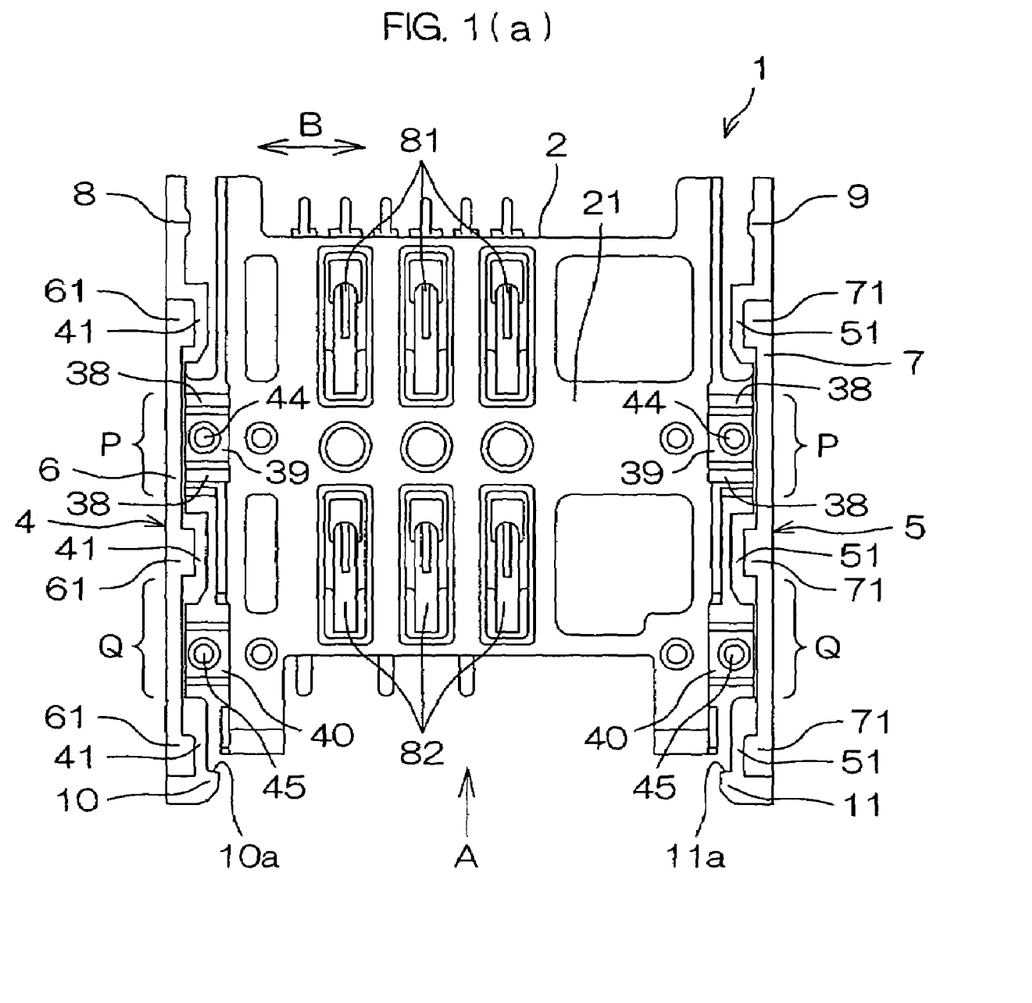
FIG. 1(a) is a plan view of a SIM socket.
Figure 1B:
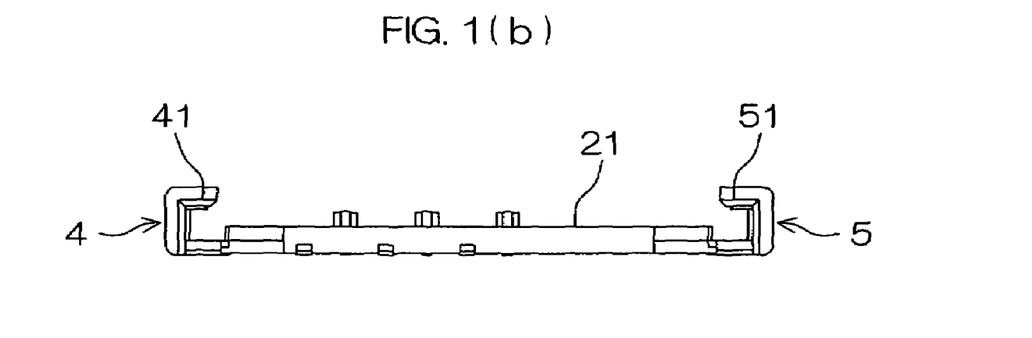
FIG. 1(b) is a front view of the SIM socket.
Figure 2:
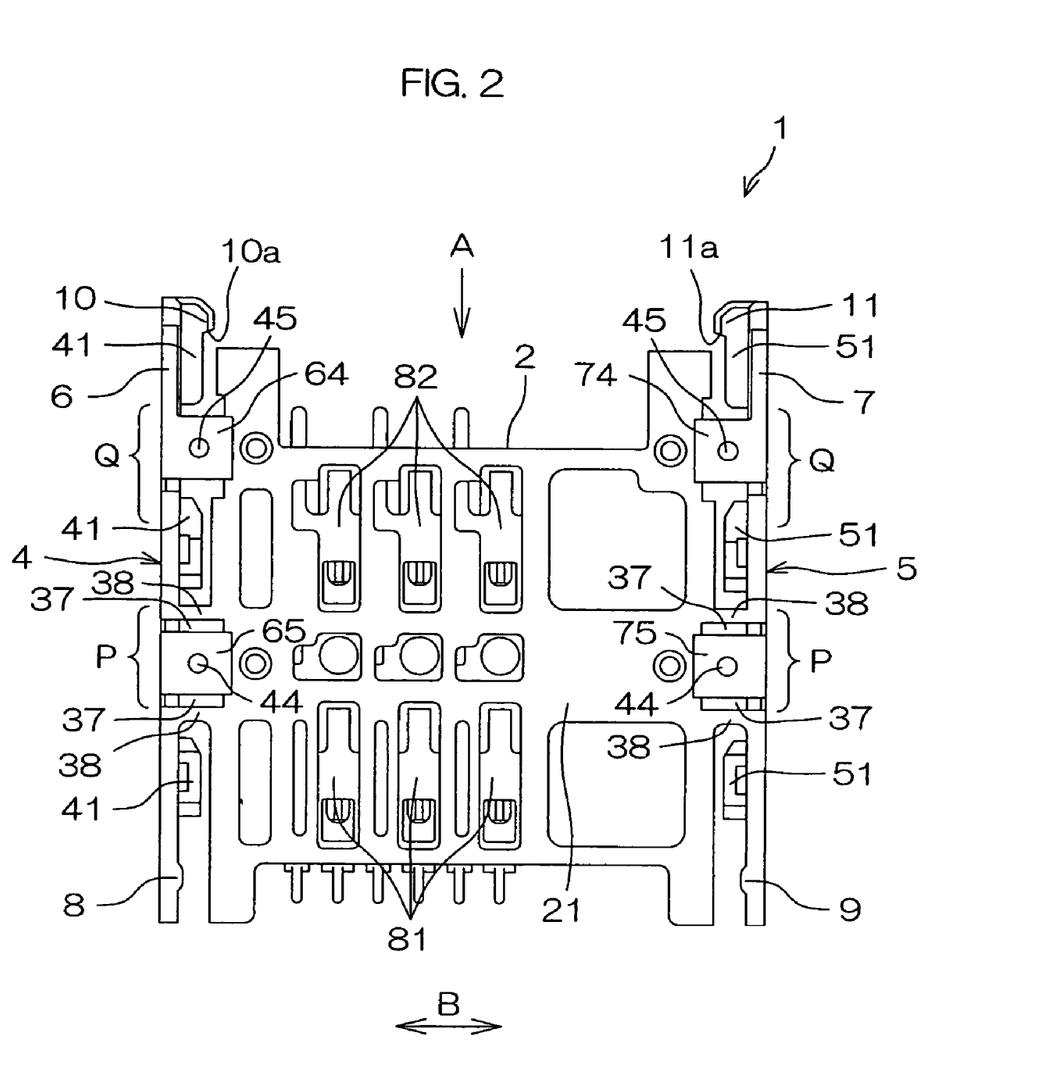
FIG. 2 is a bottom view of the SIM socket 1.
Figure 3:
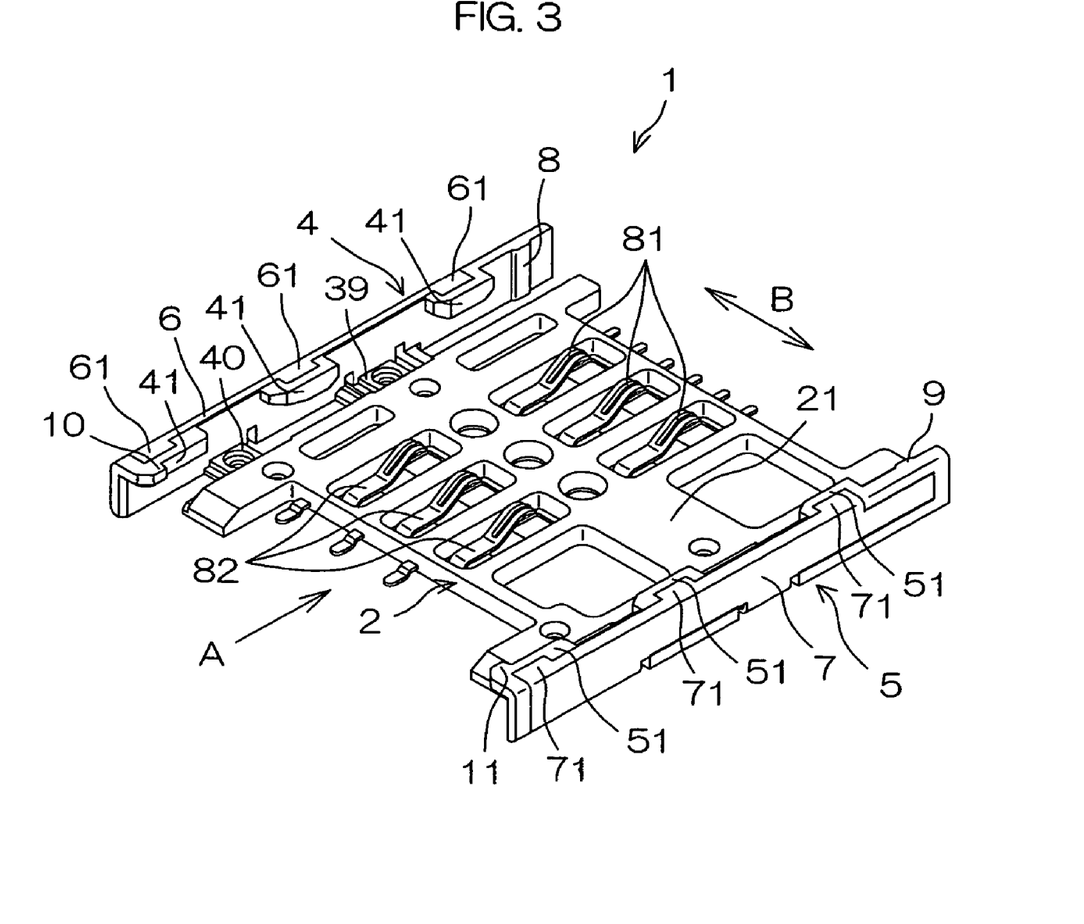
FIG. 3 is a perspective view of the SIM socket 1.

FIG. 1(a) is a plan view of a SIM socket, and FIG. 1(b) is a front view of the SIM socket. FIG. 2 is a bottom view of the SIM socket, and FIG. 3 is a perspective view of the SIM socket.

The SIM socket 1 is molded while inserting metallic connection terminals into an insulating plastic material such as polyamide resin. A part thereof made of the plastic material is a connector housing 2 that can receive a card holder 3 (see FIG. 4, described later).

The connector housing 2 is resinous and flat. This flat resin plate is designated by reference numeral 21. A direction in which a card holder 3 is inserted is designated by "A".

Guide walls 4 and 5 used to slide-insert the card holder 3 are erected on right and left sides of the flat resin plate 21 when seen from the insertion direction "A". The guide walls 4 and 5 are molded integrally with the connector housing 2 simultaneously.

The fronts of the guide walls 4 and 5 are erected at a right angle from both sides of the flat resin plate 21 as shown in FIG. 1(b) so that the card holder 3 inserted therein can be held. A bent-back part shaped like the laid letter U is formed by being bent back at three places of each of the guide walls 4 and 5. The bent-back part of the guide wall 4 is designated by reference numeral 41, and the bent-back part of the guide wall 5 is designated by reference numeral 51. The bottom of the laid-U-shaped bent-back parts 41 and 51 is shaped like the bottom of a ship in which the central part is the lowest, and parts around the central part gradually rises as shown in FIG. 3. Therefore, the card holder 3 can be smoothly inserted without colliding with the bent-back parts 41 and 51 when the card holder 3 is inserted thereinto. The positions of the bent-back parts 41 and 51 are not limited to the three places. Each of the bent-back parts 41 and 51 may be bent at two or less places or four or more places.

The side faces of the card holder 3 are brought into contact with the inner surfaces of the guide walls 4 and 5, respectively, and the upper surface of the card holder 3 is brought into contact with each of the bottoms of the laid-U-shaped bent-back parts 41 and 51 in this way. As a result, the card holder 3 inserted therein is held by the connector housing 2.

Rear lock parts 8, 9 and front lock parts 10, 11 are formed integrally with the guide walls 4 and 5.

The rear lock parts 8 and 9 protrude in convex shape from the guide walls 4 and 5 inwardly. The rear lock parts 8 and 9 lock the card holder 3 so that the card holder 3 can be held by the connector housing 2 when the card holder 3 is inserted into the inmost part of the connector housing 2.

The front lock parts 10 and 11 are members to lock the card holder 3 so that the card holder 3 does not directly drop off when the card holder 3 is drawn out to the hithermost part in order to pull out the card holder 3 inserted in the connector housing 2. The front lock parts 10 and 11 are formed near a slot used for the card holder 3, and protrude in convex shape from the guide walls 4 and 5 inwardly. As shown in FIGS. 1A, 1B, and 2, the front lock parts 10 and 11 have locking surfaces 10a and 11a, respectively, perpendicular to a direction "A" in which the card is inserted.

The guide walls 4, 5 and the flat resin plate 21 of the connector housing 2 are joined together with resin. However, the joined part therebetween is provided not over the entire side part of the flat resin plate 21 but only at a central part P and at an insertion forward part Q of the flat resin plate 21. A joining piece at the central part P is designated by reference numeral 39, and a joining piece at the forward part Q is designated by reference numeral 40.

Each of the joining pieces 39 and 40 is flat, and serves as a bridge between the guide walls 4, 5 and the flat resin plate 21 of the connector housing 2. The joining pieces 39 and 40 have holes that surround holes 44 and 45 provided in bent parts 64, 65, 74, and 75 of reinforcement tabs 6 and 7 described later.

The joining piece 39 at the central part P additionally has two ribs 38 at both sides thereof that serve as bridges between the flat resin plate 21 and the guide walls 4, 5. A space lies between these two ribs 38 and the joining piece 39. This space is defined as a groove 37. The reason why the space is provided will be described later.

As mentioned above, the joined parts 39 and 40 between the guide walls 4, 5 and the flat resin plate 21 are provided at the two places, i.e., only at the central part P and at the insertion forward part Q of the flat resin plate 21. The reason for this is that the rear lock parts 8 and 9 or the front lock parts 10 and 11 of the guide walls 4 and 5 can elastically move in a direction "B" perpendicular to the insertion direction "A" of the card holder 3 when the card holder 3 is inserted or extracted. In other words, if the guide walls 4, 5 and the flat resin plate 21 are joined together over the entire surface, the rear lock parts 8 and 9 or the front lock part 10 and 11 cannot move in the direction "B" without a great force, and it will become hard to insert or extract the card holder 3.

Therefore, the rear lock parts 8 and 9 or the front lock parts 10 and 11 are designed so that these lock parts can move in the direction "B", and, when the card holder 3 is inserted, the front lock parts 10 and 11 of the guide wall are brought into contact with second engagement parts 14 and 15, respectively, of the card holder 3 inserted therein and are laterally opened, so that the card holder 3 can be easily inserted. Additionally, when the card holder 3 is inserted into the innermost part, the rear lock parts 8 and 9 of the guide wall are brought into contact with first engagement parts 12 and 13, respectively, of the card holder 3 inserted therein, and are laterally opened, so that easy engagement can be established between the rear lock parts 8, 9 and the first engagement parts 12, 13.

However, the guide walls 4 and 5 are made of the same plastic material as the flat resin plate 21, and, essentially, are less elastic. Therefore, there is the possibility that, after the card holder 3 is inserted, a firm engagement force cannot be maintained between the rear lock parts 8, 9 and the first engagement parts 12, 13, and an unstable shake in the insertion direction "A" will occur in the card holder 3.

Another possibility is that, when the card holder 3 is extracted, the front lock parts 10 and 11 will easily slip off without allowing the front lock parts 10 and 11 to catch the card holder 3.

Therefore, in the present invention, metallic reinforcement tabs 6 and 7 are embedded integrally with the guide walls 4 and 5, in order to give elasticity to the rear lock parts 8, 9 and the front lock parts 10, 11 for the movement in the direction "B" and to give rigidity to the guide walls 4 and 5.

Each of the reinforcement tabs 6 and 7 is shaped basically like a long thin plate along the guide walls 4 and 5. Since the material of the reinforcement tabs 6 and 7 is required to be rigid and elastic, soft metal is not suitable. For example, it is recommended to use tin-plated phosphor bronze or hard metal like stainless steel.

The shape of each of the reinforcement tabs 6 and 7 will be described in detail. The reinforcement tabs 6 and 7 are formed by insert molding into the back part of the guide walls 4 and 5 so as to become integral with the guide walls 4 and 5. Accordingly, the reinforcement tabs 6 and 7 can forcefully hold down the part of the front lock parts 10 and 11 and the part of the rear lock parts 8 and 9 from the side faces of the guide walls 4 and 5 inwardly.

The lower side of the reinforcement tabs 6 and 7 is bent to become flush with the bottom surface of the flat resin plate 21 at the joined parts P and Q between the guide walls 4, 5 and the flat resin plate 21. These bent parts are designated by reference numerals 64, 65, 74, and 75. The bent parts 64, 65, 74, and 75 are firmly fixed by soldering to the wiring part of a substrate of a mobile telephone. As a result, the guide walls 4 and 5 of the connector housings 2 can be fixed to the circuit board of the mobile telephone.

Figure 9:
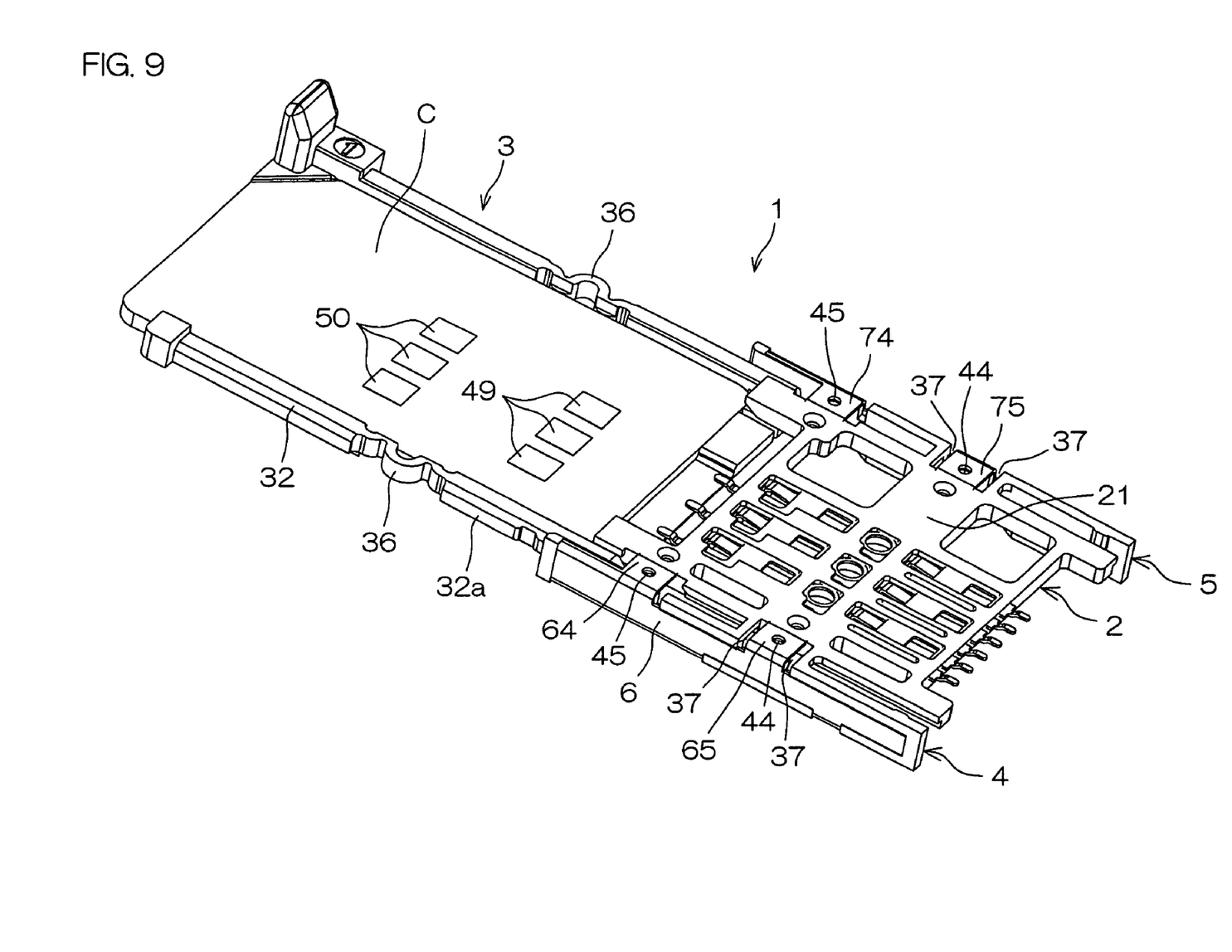
FIG. 9 is a perspective view seen from below, showing a state in which the card holder 3 is just about to be extracted from the connector housing 2 of the SIM socket 1.

Preferably, when the bent parts 64, 65, 74, and 75 are soldered, a space into which the remaining solder flees is pre-made. Therefore, holes 44 and 45 are formed at almost the center between the bent parts 64, 65 and 74, 75 as shown in FIG. 2 and FIG. 9. Further, the grooves 37 mentioned above lie on both sides of the bent parts 64, 65, 74, and 75. A molten solder flees into these holes 44 and 45 or into the groove 37, thus making it possible to minimize the thickness of the solder layer. Accordingly, the connector housing 2 is brought into firm contact with the circuit board, and, as a result, mutual position accuracy can be maintained between the insertion opening of the mobile telephone and the connector housing 2. Therefore, it becomes possible to insert the card holder 3 from the insertion opening with ease.

The upper side of the reinforcement tabs 6 and 7 is bent at a right angle so as to reinforce the laid-U-shaped bent-back parts 41 and 51 of the guide walls 4 and 5. These bent parts are designated by reference numerals 61 and 71. The bent parts 61 and 71 hold down the card holder 3 inserted in the connector housing 2 from above by bringing the bent-back parts 41 and 51 into contact from above, and the card holder 3 is prevented from rising to the surface.

On the other hand, the connector housing 2 is provided with six connection terminals 81 and 82 formed by insert molding. As shown in the perspective view (FIG. 3), the connection terminals 81 and 82 are embedded in the flat resin plate 21 of the connector housing 2, and are held thereby. Each end of the connection terminals 81 and 82 protrudes from the end face of the flat resin plate 21, and is joined to the metallic terminal of the circuit board with cream solder. The terminals may be joined together according to an ultrasonic welding method as well as according to the soldering method. The connection terminals 81 and 82 are bent back in bellows form at opposite ends. The position of the bellows-shaped bent-back part corresponds to that of the terminal part of the memory card C.

A brief description will now be given of a step of producing the SIM socket 1 and a step of mounting it onto the circuit board.

A rolled metal plate is unrolled, and is punched to be planar. The bent parts 61, 64, 65, 71, 74, and 75 are then bent to produce each of the reinforcement tabs 6 and 7 as a single article. Thereafter, the reinforcement tabs 6, 7 and the connection terminals 81, 82 are placed in a mold having a cavity corresponding to the external shape of the connector housing 2, and synthetic resin is injected thereinto for integral molding.

The bent parts 64, 65, 74, and 75 of the reinforcement tabs 6 and 7 of the thus produced SIM socket 1 are joined to the substrate of the mobile telephone by soldering, and the connection terminals 81 and 82 are connected to this substrate, whereby the SIM socket 1 can be fixed to the substrate.

Sufficient rigidity and elasticity can be given to the guide walls 4 and 5 especially by soldering the bent parts 64, 65, 74, and 75 of the reinforcement tabs 6 and 7 directly with the substrate of the mobile telephone. Therefore, the card holder 3 can be firmly held from right, left, up, and down directions when the rear lock parts 8, 9 or the front lock parts 10, 11 are engaged with the first engagement parts 12, 13, 14, and 15 of the card holder 3. Additionally, when the card holder 3 is extracted, elastic catching can be given so that the card holder 3 does not drop off.

In the structure of the SIM socket 1 described above, when the card holder 3 holding the memory card C is inserted into the connector housing 2, the terminal parts 49 and 50 of the memory card C come into contact with the bellows-shaped bent-back parts of the connection terminals 81 and 82, whereby an electric connection is established between the SIM card and the circuit of the device body so that the device body functions.

Next, the card holder 3 will be described in detail.

Figure 4:
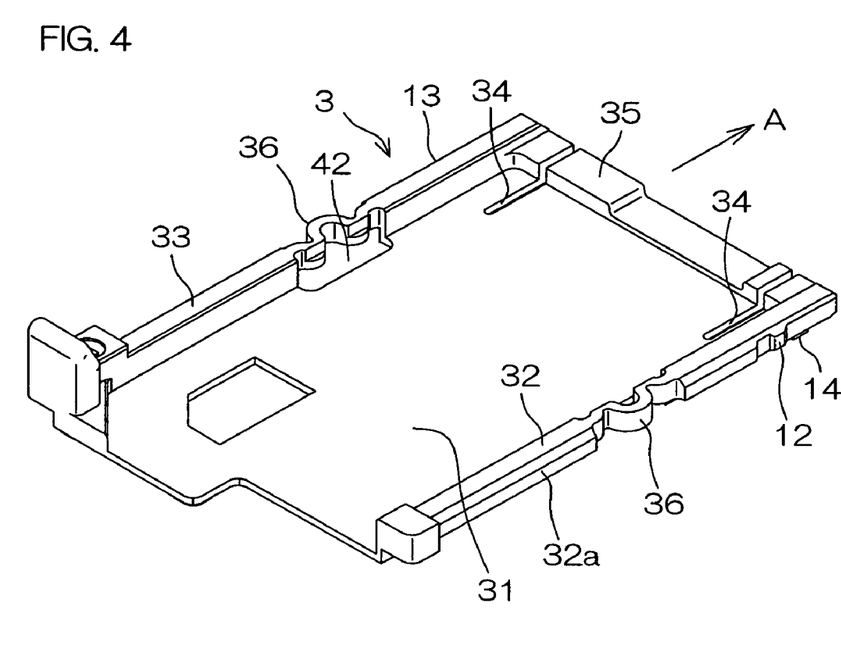
FIG. 4 is a perspective view seeing the bottom of a card holder 3 from above.
Figure 5:
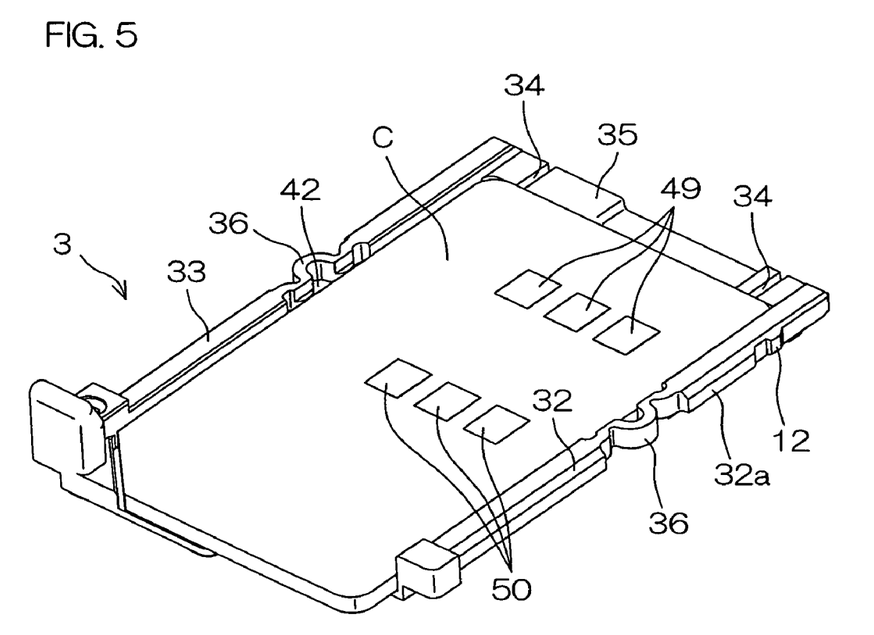
FIG. 5 is a perspective view showing a state in which a memory card C is held in the card holder 3.

FIG. 4 is a perspective view showing the bottom of the card holder 3. FIG. 5 is a perspective view showing a state in which the memory card C is held in the card holder 3.

Figure 6:
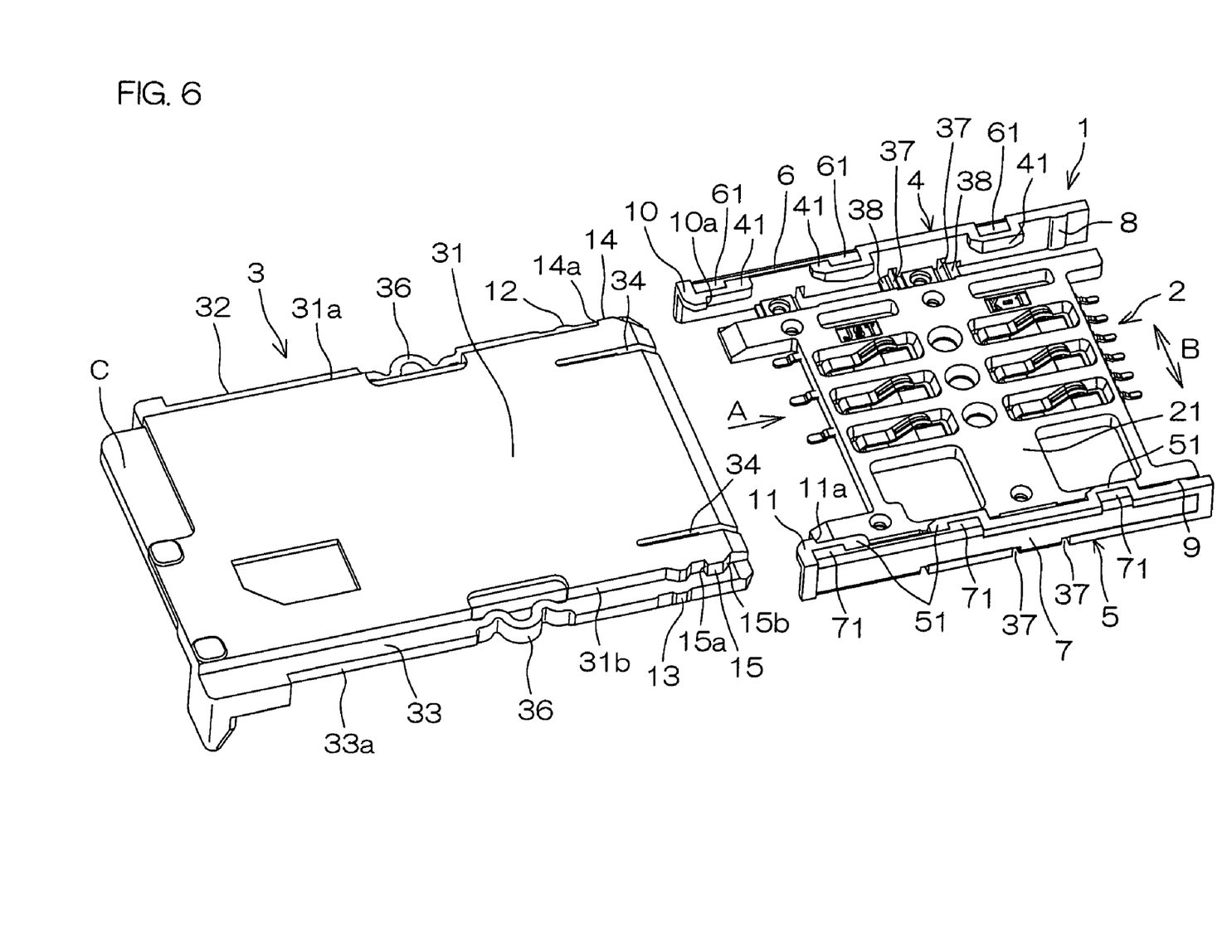
FIG. 6 is a perspective view in which the card holder 3 holding the memory card C is just about to be inserted into a connector housing 2 along guide walls 4 and 5 of the SIM socket.

FIG. 6 is a perspective view in which the card holder 3 holding the memory card C is just about to be inserted into the SIM socket 1 along the guide walls 4 and 5 of the connector housing 2.

The card holder 3 is made of a flat resin plate 31 to contain the memory card C. Polyacetal (POM) resin, polyamide resin, etc., can be used as the resin material. Slide parts 32 and 33 used to slide in the card holder 3 along the inside faces of the guide walls 4 and 5 of the connector housing 2 are formed at the lower side parts of both side faces 31a and 31b of the resin plate 31 as shown in FIG. 6. The slide parts 32 and 33 have straight outside faces 32a and 33a, respectively, that slide on the inside faces of the guide walls 4 and 5.

Further, sidewalls to contain the memory card C in the flat resin plate 31 are formed on the back side of the card holder 3 as shown in FIG. 4. These sidewalls are formed integrally with the slide parts 32 and 33, and are designated by the same reference numerals "32 and 33". Further, an end wall 35 to hold the memory card C from its front is provided at the end thereof in the direction "A"

Two kinds of engagement parts are formed at the front end of the side parts of the card holder 3.

As one of the two kinds, first projecting engagement parts 12 and 13 are formed on the outside faces 32a and 33a of both slide parts 32 and 33. These first engagement parts 12 and 13 go beyond the rear lock parts 8 and 9 of the guide walls 4 and 5, and are engaged when the card holder 3 is inserted.

As the other kind, second projecting engagement parts 14 and 15 are formed on the side faces 31a and 31b of the card holder 3 as shown in FIG. 6. The second engagement parts 14 and 15 have inclined-surfaces 14b and 15b, respectively, on its rear side (i.e., at its forward end in the card insertion direction "A"). The second engagement parts 14 and 15 further have locking surfaces 14a and 15a, respectively, formed almost perpendicularly to the card insertion direction "A" on its near side.

When the card holder 3 is inserted, the inclined surfaces 14b and 15b of the second engagement parts 14 and 15 push the front lock parts 10 and 11 of the guide walls 4 and 5 open, and the second engagement parts 14 and 15 guide the card holder 3 while being in contact with the laid-U-shaped bent-back parts 41 and 51.

When the card holder 3 is drawn out to the hithermost position so as to extract the card holder 3 inserted in the connector housing 2, the locking surfaces 14a and 15a are caught by the locking surfaces 10a and 11a of the front lock parts 10 and 11, so that the card holder 3 is prevented from directly slipping out.

Each of the slide parts 32 and 33 of the card holder 3 has a bulging semicircular contact piece 36. The outermost part of the contact piece 36 is slightly extended more outwardly than the slide parts 32 and 33. The distance between the outermost parts of the contact pieces 36 of the slide parts 32 and 33 is greater than the distance between the inside faces of the guide walls 4 and 5. This dimensional setting allows the contact pieces 36 to slide while being elastically pressed against and being in contact with the inside faces of the guide walls 4 and 5 when the card holder 3 is inserted.

The contact piece 36 is not necessarily required to be shaped like a bulging semicircle. Any shape is permissible if the outermost part of the contact piece 36 is extended more outwardly than the outside faces 32a and 33a of the slide parts 32 and 33. For example, the contact piece 36 may be shaped like a projection jutting out from the outside faces 32a and 33a.

The contact piece 36 is not connected directly to the resin plate 31 of the card holder 3. A space 42 having no resin is formed between the contact piece 36 and the resin plate 31. This space 42 makes it possible to operate the contact piece 36 more elastically.

Slits 34 in the card insertion direction "A" are formed near the front end of the card holder 3. The slit 34 serves to elastically move the second engagement parts 14 and 15 of the card holder 3 inwardly when the card holder 3 is inserted, and hence prevents the inclined surfaces 14b and 15b from colliding with the front lock parts 10 and 11 of the guide walls 4 and 5 so that the card holder 3 cannot be inserted. The card holder 3 can be smoothly inserted by these slits 34.

With the thus formed structure, the outermost part of the contact piece 36 can be brought into elastic contact with the inside faces of the guide walls 4 and 5 when the card holder 3 is inserted into the guide walls 4 and 5, and the card holder 3 can be smoothly inserted without an unsteady movement in the width direction "B".

Further, the card holder 3 can be prevented from unstably shaking in the width direction "B" after the card holder 3 is inserted. Contact between the connection parts 49, 50 of the memory card C and the connection terminals 81, 82 can be protected by this shake-preventing effect.

Figure 7:
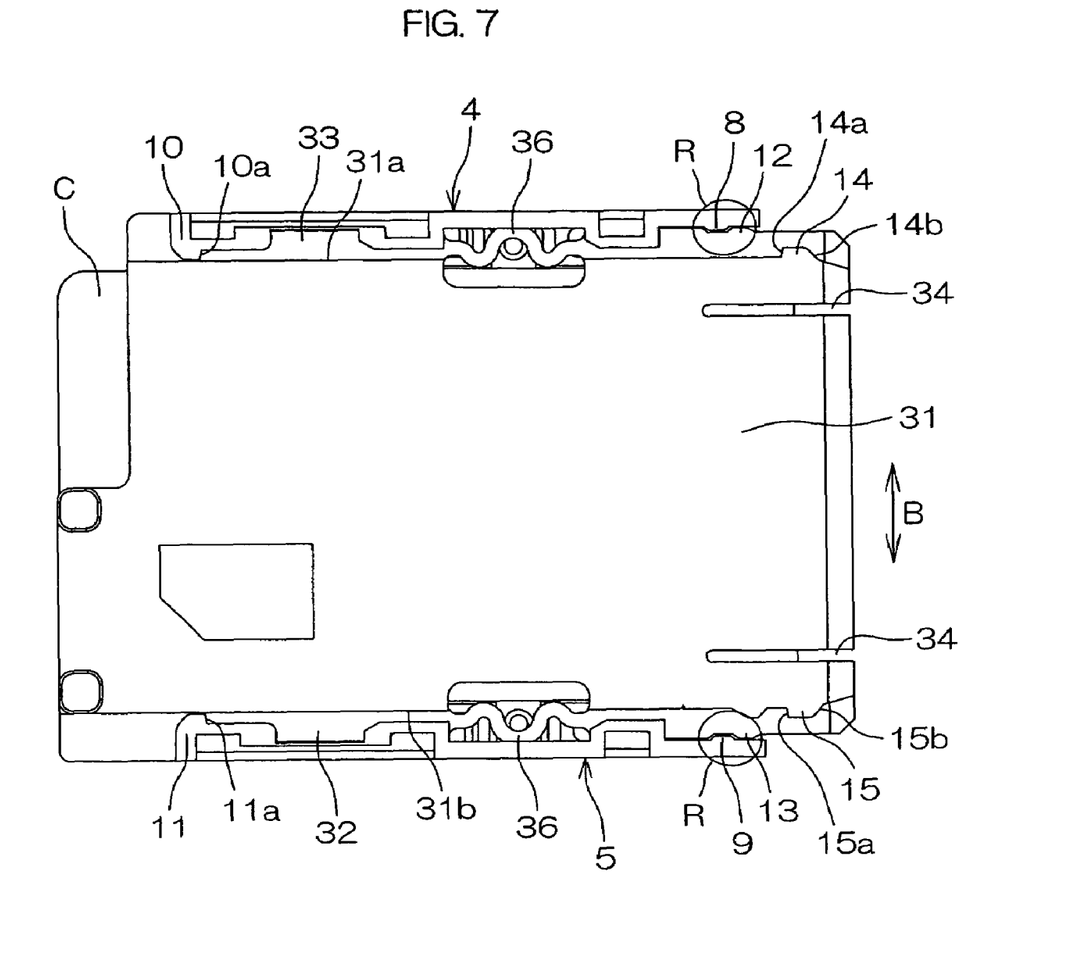
FIG. 7 is a plan view showing the card holder 3 inserted in the connector housing 2 of the SIM socket 1.

FIG. 7 is a plan view showing a state in which the card holder 3 is inserted in the connector housing 2. As shown in FIG. 7, the first engagement parts 12 and 13 formed on both slide parts 32 and 33 of the connector housing 2 go beyond the rear lock parts 8 and 9 of the guide walls, and are engaged. This engaged part is designated by reference character R. The bulging semicircular contact piece 36 of the card holder 3 comes into contact with the inner surfaces of the guide walls 4 and 5 while applying pressure thereonto. As a result, the card holder 3 is prevented from jouncing in the width direction "B" in the connector housing 2.

Figure 8:
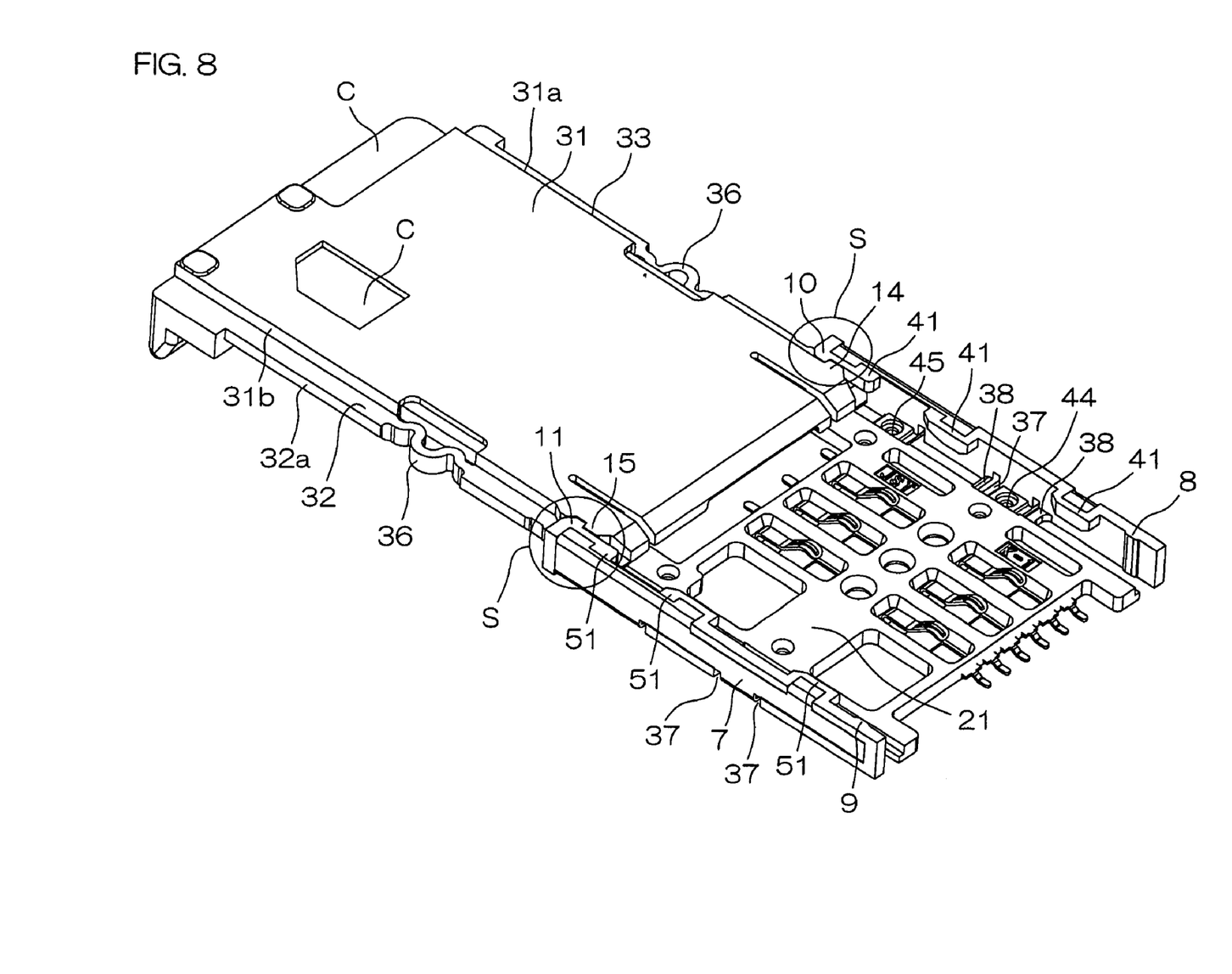
FIG. 8 is a perspective view seen from above, showing a state in which the card holder 3 is just about to be extracted from the connector housing 2 of the SIM socket 1.

FIG. 8 and FIG. 9 are perspective views, each showing a state in which the card holder 3 is just about to be extracted from the connector housing 2 of the SIM socket 1. The perspective view of FIG. 8 is seen from above, and that of FIG. 9 is seen from below.

As shown in FIG. 8, the locking surfaces 14a and 15a of the second engagement parts 14 and 15 formed on the side faces 31a and 31b of the card holder 3 are engaged with the locking surfaces 10a and 11a of the front lock parts 10 and 11 when the card holder 3 is drawn out to the hithermost position. This engaged part is designated by reference character S. This engagement makes it possible to prevent the card holder 3 from dropping off when the card holder 3 is extracted.

Although the embodiment of the present invention has been described as above, the present invention is not limited to the foregoing one. For example, the present invention is applicable to a case in which the memory card C is attached directly to the SIM socket, without being limited to the embodiment of the present invention in which the card holder 3 holding the memory card C is attached to the SIM socket as described above. If the memory card C is attached directly to the SIM socket, the memory card C is, of course, required to have the first and second engagement parts that can be engaged with the rear lock parts 8, 9 and the front lock parts 10, 11 of the connector housing 2. Additionally, although the SIM socket of the present invention is to be attached to the circuit board in the mobile telephone in the above embodiment, the present invention is widely applicable to communication devices such as PDAs and personal computers, without being limited to the mobile telephone. Besides, various modifications can be carried out within the scope of the present invention.

What is claimed is:

1. A card holder for a SIM (Subscriber Identification Module) socket, the card holder being insertable into the SIM socket which is attached to a circuit board in a device body in a state of holding a memory card, the card holder comprising slide parts along which the card holder is slid in, the slide parts being formed on side faces, respectively, of the card holder along inside faces of guide walls of the SIM socket, each of the slide parts having a contact piece that is extended more outwardly than an outer surface of the respective slide part, each of the slide parts of the card holder has a first engagement part that is engaged with a rear lock part provided on the guide wall of the SIM socket in a state in which the card holder is inserted into an inmost part and each of the slide parts of the card holder has a second engagement part disposed adjacent the first engagement part that is engaged with a front lock part provided on the guide wall of the SIM socket in a state in which the card holder is drawn out to a hithermost part.

2. A card holder for a SIM socket according to claim 1, wherein the contact piece has a bulging shape.

3. A card holder for a SIM socket according to claim 2, wherein a space exists between the contact piece and a main body of the card holder.

4. A card holder for a SIM socket according to claim 1, further comprising a slit formed in the insertion direction near a front end of the card holder.

* * * * *